Jan. 21, 1958  E. A. BERKERY  2,820,941
CURRENT SUPPLY APPARATUS
Filed Aug. 17, 1956
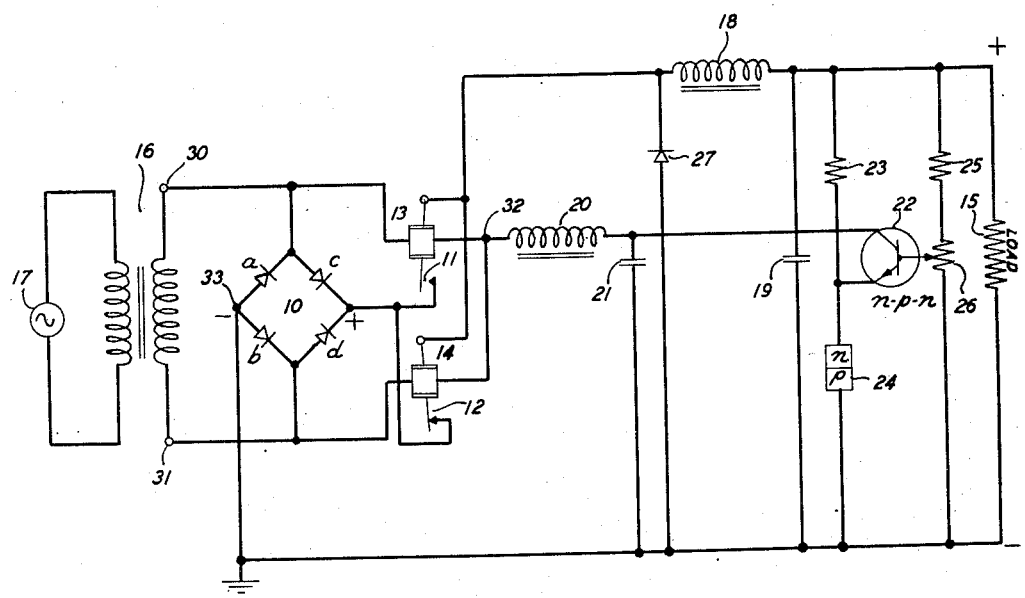
INVENTOR
E. A. BERKERY
BY
ATTORNEY United States Patent Office 2,820,941
Patented Jan. 21, 1958

2,820,941

CURRENT SUPPLY APPARATUS

Eugene A. Berkery, Sayreville, N. J., assignor to Bell Telephone Laboratories, Incorporated, New York, N. Y., a corporation of New York Application August 17, 1956, Serial No. 604,839

9 Claims. (Cl. 321—18)

This invention relates to current supply apparatus and particularly to apparatus for supplying current to a load circuit through the contacts of electromagnetic relays responsive to load voltage changes.

An object of the invention is to provide improved regulated switching means for controlling the supply of current to a load.

In a specific embodiment of the invention herein shown and described for the purpose of illustration, there are provided a pair of electromagnetic relays each of which, when operated, completes a circuit for supplying current from a source of rectified alternating current to a load. The relays are energized by alternating current from the supply source to cause the relays to operate in response to alternate half-cycle periods of the current from the supply source, respectively. A shunt current path the resistance of which varies in response to load voltage changes is provided for diverting current from the relays to thereby control the interval separating the time of release of one of the relays and the subsequent time of operation of the other relay. The average current supplied to the load is thus controlled to minimize load voltage changes.

The invention will now be described in greater detail with reference to the accompanying drawing the single figure of which is a schematic view of a current supply apparatus embodying the invention.

Referring to the drawing, there is provided a bridge rectifier 10 for supplying current through the pairs of contacts 11 and 12 of relays 13 and 14, respectively, when operated, to a load 15. The rectifier 10 comprises four rectifying elements *a*, *b*, *c* and *d*. The input terminals of rectifier 10 are connected to the secondary winding of a transformer 16 the primary of which is connected to an alternating-current supply source 17. The pairs of contacts 11 and 12 are connected in parallel so that the load circuit is completed when either relay 13 or 14 is operated to close one of the pairs of contacts 11, 12. The positive terminal of rectifier 10 is connected through closed contacts 11 or 12 and through an inductor 18 of a ripple filter to the positive load terminal, the filter also comprising a shunt condenser 19. The negative load terminal is connected to the grounded negative output terminal 33 of rectifier 10.

The windings of relays 13 and 14 are connected in series across the secondary winding of transformer 16. The common terminal 32 of the windings of relays 13 and 14 is connected through an inductor 20 of a ripple filter to the collector of an n-p-n type transistor 22, the filter also comprising a shunt condenser 21. A shunt path connected across the load comprises in series a resistor 23 and a constant voltage p-n junction diode 24. Another shunt path across the load comprises a resistor 25 and a potentiometer 26 in series. The emitter of transistor 22 is connected to the common terminal of resistor 23 and the diode 24. The base of transistor 22 is connected to the adjustable tap of potentiometer 26. A rectifying element 27 is provided in a path connecting the terminal of inductor 18 remote from the load 15 to ground. Interruption of the current flowing through inductor 18 produces a transient voltage across inductor 18, the terminal of inductor 18 which is connected to the load being made positive with respect to its other terminal. A current due to this transient voltage across inductor 18 may flow from its positive terminal through condenser 19 and through rectifying element 27 in its conducting or low resistance direction to the other terminal of the inductor. Since the resistance of the rectifying element in its forward direction is small, the voltage across the input of the ripple filter 18, 19 remains small during each period when the contacts 11 and 12 of both relays 13 and 14 are open.

The circuit is designed so that for normal operation each of relays 13 and 14 will release to open its contacts before the other of the relays is operated to close its contacts. The interval which separates the time of release of one of the relays and the subsequent time of operation of the other relay increases in response to an increase of load voltage, for example, thereby reducing the average current supplied to the load and minimizing the assumed increase of load voltage.

The terminals of the secondary winding of transformer 16 are designated by the numerals 30 and 31, respectively. Each of the relays 13 and 14 is polarized magnetically so that it will operate to close its contacts only in response to current flowing through its winding in a predetermined direction, relay 13 being polarized so that it operates in response to half-cycle periods of one polarity of the alternating current and relay 14 being polarized so that it operates in response to half-cycle periods of opposite polarity of the alternating current. For example, relay 14 may be polarized so that it will operate to close its contacts in response to current of sufficient amplitude supplied to its winding during a half-cycle period of the alternating current when terminal 30 is positive with respect to terminal 31. During this period, which we may call the positive half cycle, current flows from the terminal 30 through the winding of relay 13 and then divides into two branch paths. The current in one of the branch paths flows through the winding of relay 14 to the terminal 31 and the current in the other branch path, which may be called a control current path, flows through inductor 20, into the collector and out of the emitter of transistor 22, and through the constant voltage diode 24 to the common terminal of rectifying elements *a* and *b*. From this common terminal, the current flows through rectifying element *b* to the terminal 31. Relay 13 is polarized so that it operates in response to a half-cycle period of the alternating current when terminal 31 is positive with respect to terminal 30. During this period, which we may call the negative half cycle, current flows from terminal 31 through the winding 14 and then divides into two branch paths. The current in one of the branch paths flows through the winding of relay 13 to the terminal 30 and the current in the other branch path, which may be called a control current path, flows through inductor 20, into the collector and out of the emitter of transistor 22 and through the diode 24 to the common terminal of rectifying elements *a* and *b*. The current flows from this common terminal through rectifying element *a* to terminal 30.

Viewed somewhat differently, it is seen that when the terminal 30 is positive with respect to terminal 31, for example, current will flow through relay 13 and through the control current path comprising transistor 22 to ground and thence through the rectifying element *b* in the forward or conducting direction to terminal 31. The control current path is thus, in effect connected directly across the winding of relay 14, the voltage drop across the rectifying element *b* being relatively small. The voltage between terminals 32 and 33 is a full wave pulsating voltage and, if no current were flowing in the control current path, the amplitude of the voltage would be substantially equal to one-half the output voltage of rectifier 10. However, when current flows through the control current path comprising transistor 22, the voltage across the path decreases due to the voltage drop across the resistance in the circuit comprising the secondary winding of transformer 16 and the winding of relay 13. Since the control current path comprising transistor 22 is effectively connected across the winding of relay 14, the amplitude of the voltage pulse across the winding of relay 14 will likewise decrease to cause a reduction of the amplitude of the current pulse flowing through the winding of relay 14. Similarly, when the potential of terminal 31 is positive with respect to the potential of terminal 30, current will flow through the winding of relay 14 and through the control current path comprising the transistor 22 and rectifying element $a$ in the forward direction. Due to this current flow, the voltage pulse across the winding 13 will be reduced in amplitude to cause an amplitude reduction of the current pulse flowing through winding 13.

If the load voltage should increase, for example, the base of transistor 22 will become relatively more positive with respect to its emitter, thus increasing the current flowing into the base. As a result, the current flowing in the control current path through inductor 20 into the collector of transistor 22 increases. This current increase in the control current path causes a reduction in amplitude of the current pulse flowing through the winding of relay 14 for each positive half cycle. The contacts 12 thus close later and open earlier relative to the closing and opening times, respectively, prior to the assumed increase of load voltage. Similarly, for each negative half cycle the contacts 11 close later and open earlier. Therefore, an increase of load voltage has the effect of increasing the interval between the time of opening the contacts of either one of relays 13 and 14 and the time of subsequently closing the contacts of the other of the relays. The average current supplied from rectifier 10 to the load circuit is thus decreased, thereby minimizing the initially assumed increase of load voltage. Conversely, when the load voltage decreases, the interval between the time of opening the contacts of either one of relays 13 and 14 and the time of subsequently closing the contacts of the other of the relays is decreased to increase the average current supplied to the load circuit and thus minimizing the decrease of load voltage.

If desired, the circuit shown may be modified to use a p-n-p type transistor in place of the n-p-n type transistor 22. In this case, polarized relays 13 and 14 are interchanged, resistor 23 and the constant voltage diode 24 are interchanged and the resistor 25 and the potentiometer 26 are interchanged. When terminal 30 is positive with respect to terminal 31, a first current will flow through one branch path comprising the winding of relay 14 to terminal 32, a second current will flow through a second branch path comprising rectifying element $c$ and the control current path comprising the p-n-p transistor to terminal 32. A current equal to the sum of the first and second currents will flow through relay winding 13. When terminal 31 is positive with respect to terminal 30, a first current will flow through one branch path comprising the winding of relay 13 to terminal 32, a second current will flow through a second branch path comprising rectifying element $d$ and the control current path comprising the p-n-p transistor to terminal 32. A current equal to the sum of the first and second currents will flow through relay winding 14.

What is claimed is:

1. Apparatus for controlling the supply of energizing current from a current supply source to a load circuit including a load, comprising an electromagnetic relay having a pair of contacts connected in said load circuit and having a winding, means for supplying current to said winding for causing said contacts to close intermittently to complete said load circuit, a shunt current path across said winding, and means responsive to the energization of said load for controlling the ratio of the current in said shunt path to the current in said relay winding to thereby control the intermittent closing of said contacts.

2. In combination, a first and a second electromagnetic relay each having a winding and a pair of contacts, means for supplying current from a supply source through a load circuit to a load, means for completing said load circuit through the contacts of each of said relays when operated, means for supplying alternating current from an alternating-current source through said windings in series, said relays being polarized so that one of said relays is operated in response to current of one polarity of said alternating-current source and the other of said relays is operated in response to current of opposite polarity of said alternating-current source, a current path for diverting current from the winding of each of said relays to reduce the current supplied to the winding, and means responsive to the load voltage for controlling the resistance of said current path to thereby control the opening and closing of the contacts of each of said relays.

3. In combination, a first and a second electromagnetic relay each having a pair of contacts, a circuit for supplying current from a source through a load circuit to a load, said load circuit being closed through the contacts of each of said relays when operated, means for operating and subsequently releasing said relays repeatedly in succession, and control means for varying the interval separating the release of one of said relays and the subsequent operation of the other of said relays to control the current supplied to said load.

4. A combination in accordance with claim 3 in which said control means is responsive to load voltage.

5. In combination, a first and a second electromagnetic relay each having a winding and a pair of contacts, a circuit for supplying current from a source through a load circuit to a load, said load circuit being closed through the contacts of each of said relays when operated, means for supplying current from an alternating-current supply source to said relay windings in series to cause said relays to be operated during half-cycle periods of opposite polarity of said source respectively, and means responsive to load voltage changes for further controlling the energization of said relay windings to vary the operated intervals of said relays respectively, during said half-cycle periods.

6. In combination, a relay having a pair of contacts and a winding, said relay being polarized to cause said contacts to close in response to current of sufficient amplitude flowing through said winding in a predetermined direction, means for supplying alternating current from a supply source to said winding, a shunt current path across said winding comprising an asymmetrically conducting element poled to conduct current in its low resistance direction when current flows in said predetermined direction through said winding, and means for controlling the impedance of said shunt current path to control the closing time of said contacts and the subsequent opening time of said contacts, said contacts being closed intermittently once per cycle of said alternating current.

7. In combination, a first polarized relay having a first winding, a second polarized relay having a second winding, a source of alternating current having a first and a second terminal, a first current path which may be traced from said first terminal through said first winding to a common terminal of said windings and thence through said second winding to said second terminal, a first and a second rectifying element, a second path which may be traced from said first terminal through said first rectifying element to a common terminal of said rectifying elements and thence through said second rectifying element to said second terminal, said rectifying elements being oppositely poled in said second path, a control current path connecting the common terminal of said windings to the common terminal of said rectifying elements, said first relay being polarized to operate when current flows from one terminal of said source through said first rectifying element in its low resistance direction, said control current path and said second winding all in series, to the other terminal of said source, said second relay being polarized to operate when current flows from said other terminal of said source through said second rectifying element in its low resistance direction, said control current path and said first winding all in series to said one terminal of said source, each of said relays operating when the current through its winding is increased to a sufficient amplitude and subsequently releasing when the current amplitude through its winding is decreased sufficiently, and means for controlling the conductance of said control current path for controlling the interval separating the time of release of one of said relays and the subsequent time of operation of the other of said relays.

8. In combination, a bridge rectifier having a pair of input terminals connected to an alternating-current supply source and a pair of output terminals, means for supplying rectified current from said output terminals to a load circuit including a load, a first and a second polarized relay each having a winding and a pair of contacts, said load circuit being completed through the contacts of either of said relays when operated, means for connecting the windings of said relays in series to said alternating-current supply source, a transistor having a collector, an emitter and a base, a control current path comprising said collector and emitter connecting the common terminal of said windings to one of said pair of rectifier output terminals, said control current path diverting current from said relay windings alternately in succession, each relay being polarized to operate while current is being diverted therefrom through said control current path, each relay operating when the current through its winding reaches a sufficient amplitude and subsequently releasing when the current amplitude through its winding is decreased sufficiently, and means responsive to load voltage changes for controlling the current in said control current path to control the interval separating the time of release of either of said relays and the subsequent time of operation of the other of said relays, thereby minimizing said load voltage changes.

9. A combination in accordance with claim 8 in which there are provided a filter inductor in said load circuit through which the load current flows when either of said relays is operated, and means for reducing the transient voltage set up across said inductor due to the interruption of the load circuit at said relay contacts.

No references cited.